United States Patent
Fedyk et al.

(10) Patent No.: US 10,027,571 B2
(45) Date of Patent: Jul. 17, 2018

(54) LOAD BALANCING

(71) Applicant: HEWLETT PACKARD ENTERPRISE DEVELOPMENT LP, Houston, TX (US)

(72) Inventors: Don Fedyk, Littleton, MA (US); Bruce E. LaVigne, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 36 days.

(21) Appl. No.: 15/222,109

(22) Filed: Jul. 28, 2016

(65) Prior Publication Data

US 2018/0034724 A1 Feb. 1, 2018

(51) Int. Cl.
 *H04L 12/721* (2013.01)
 *H04L 12/707* (2013.01)
 *H04L 12/803* (2013.01)

(52) U.S. Cl.
 CPC ............ *H04L 45/123* (2013.01); *H04L 45/24* (2013.01); *H04L 45/38* (2013.01); *H04L 47/125* (2013.01)

(58) Field of Classification Search
 CPC ....... H04L 45/24; H04L 45/123; H04L 45/38; H04L 47/125; H04L 45/12; H04L 45/121; H04L 47/10; H04W 40/02
 USPC ........................................................ 370/238
 See application file for complete search history.

(56) References Cited

U.S. PATENT DOCUMENTS

| | | | | |
|---|---|---|---|---|
| 8,787,400 B1 * | 7/2014 | Barth | .................. | H04L 45/24 370/419 |
| 9,225,628 B2 * | 12/2015 | Zahavi | .................. | H04L 45/124 |
| 9,722,932 B1 * | 8/2017 | Brandwine | ......... | H04L 47/2441 |
| 2004/0246973 A1 * | 12/2004 | Hoang | .................. | H04L 45/02 370/395.21 |
| 2005/0182849 A1 * | 8/2005 | Chandrayana | .......... | H04L 45/04 709/235 |
| 2006/0182035 A1 * | 8/2006 | Vasseur | .................. | H04L 45/00 370/238 |

(Continued)

*Primary Examiner* — Robert Lopata
(74) *Attorney, Agent, or Firm* — Hewlett Packard Enterprise Patent Department

(57) ABSTRACT

Example implementations relate to load balancing network traffic flows in a network switching device. According to an example, a network switching device may include a port to receive a packet in a network flow, a bin mapper module to map the packet to a bin of a plurality of bins, and a path determination module to determine available paths from the network switching device to a destination device for the packet. The device can also include a profile score module to determine a profile score for each candidate link implicated by the determined available paths, the profile score being based on a proportion of the available paths that use the candidate link. The device can also include a link-usage-by-destination score module to determine, for each candidate link, a link-usage-by-destination score that represents an amount of traffic that has been sent on each candidate link to the destination relative to all candidate links. A load balancer can then select a candidate link for the network flow based on comparing the profile scores of the candidate links with the link-usage-by-destination scores of the candidate links and create a bin-link mapping between the bin and the selected candidate link.

17 Claims, 3 Drawing Sheets

(56) References Cited

U.S. PATENT DOCUMENTS

| | | | | |
|---|---|---|---|---|
| 2006/0253607 A1* | 11/2006 | Schollmeier | ............ | H04L 45/12 709/241 |
| 2012/0057466 A1* | 3/2012 | Allan | .................... | H04L 45/125 370/238 |
| 2012/0179800 A1* | 7/2012 | Allan | .................... | H04L 45/245 709/223 |
| 2013/0107712 A1* | 5/2013 | Allan | ...................... | H04L 45/24 370/235 |
| 2013/0286846 A1* | 10/2013 | Atlas | ...................... | H04L 45/34 370/236 |
| 2014/0355615 A1* | 12/2014 | Chang | .................... | H04L 45/64 370/392 |
| 2015/0032871 A1* | 1/2015 | Allan | .................... | H04L 47/125 709/223 |
| 2015/0271061 A1* | 9/2015 | Byun | .................... | H04L 47/125 370/392 |
| 2015/0326476 A1* | 11/2015 | Ye | ........................... | H04L 47/12 370/235 |
| 2017/0019336 A1* | 1/2017 | Zhang | ................. | H04L 12/6418 |
| 2017/0070416 A1* | 3/2017 | Narayanan | ............. | H04L 45/02 |
| 2017/0223572 A1* | 8/2017 | Lee | .................... | H04W 28/065 |

* cited by examiner

120

121 — Determining a number of bytes sent along a candidate link toward the ECMP destination over a sliding window 122 — Calculating the link-usage-by-ECMP-destination score for the candidate link by dividing the number of byes by a total number of bytes sent to the ECMP destination along all candidate links over the sliding window

211 — Determining a next-up link for the ECMP destination

212 — Detecting a flowlet boundary in the network flow

213 — Creating a new bin-link mapping between the bin and the next-up link

*FIG. 2*

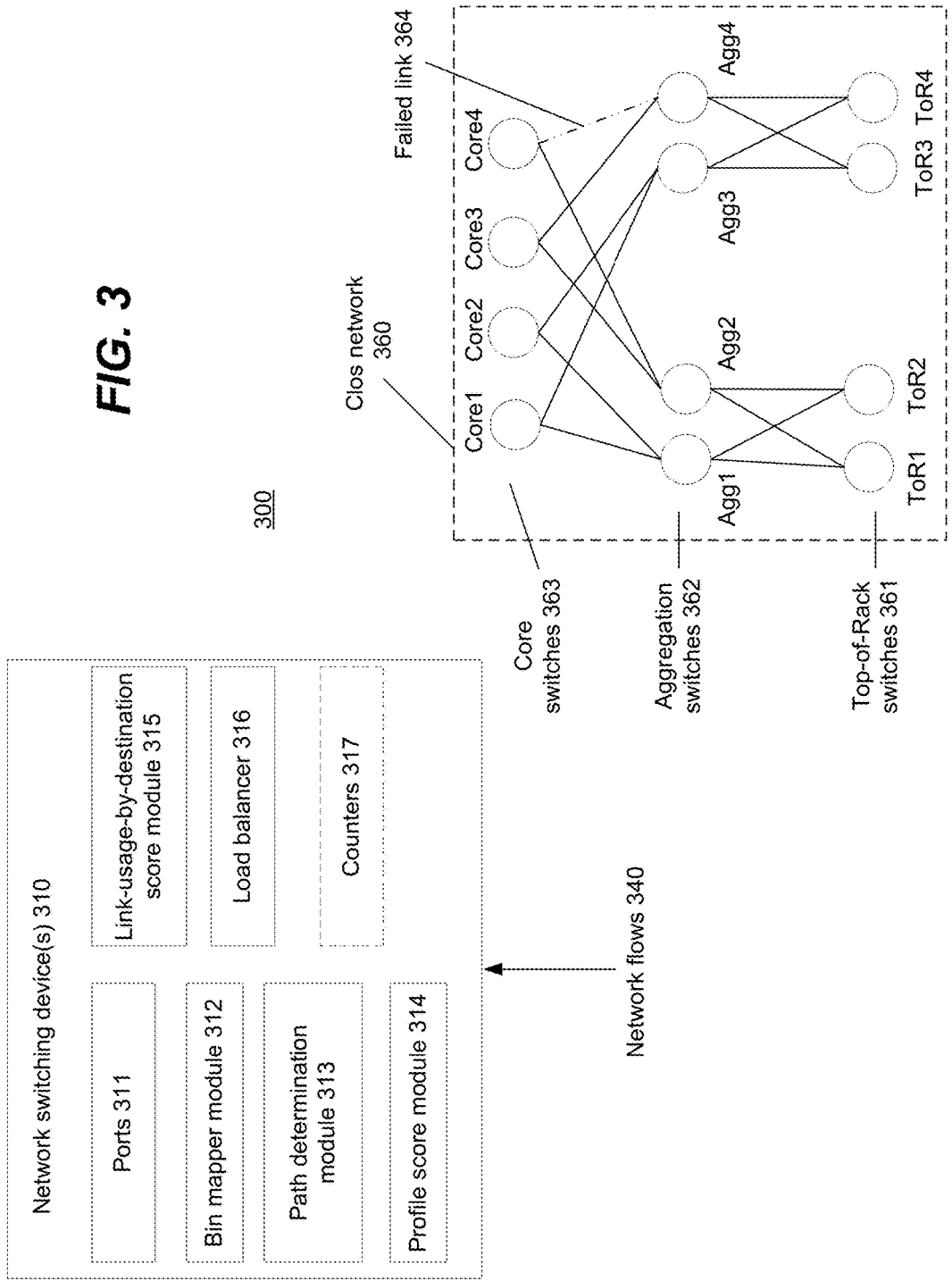

LOAD BALANCING

BACKGROUND

Load balancing of network traffic can be performed in order to better use network resources. If load balancing is not performed, some links can become overused while others remain lightly used. The overused links can cause bottlenecks in the network leading to traffic congestion. Load balancing attempts to avoid congestion by spreading the network traffic over the available links in a more optimal fashion, so as to try to avoid overutilization of any single link.

BRIEF DESCRIPTION OF THE DRAWINGS

FIG. 1(b) illustrates a flow chart of an example method for load balancing network traffic, according to an example.

FIG. 2 illustrates a flow chart of an example method for load balancing network traffic, according to an example FIG. 3 illustrates an example environment with a network switching device configured to load balance network traffic, according to an example.

DETAILED DESCRIPTION

Figure 1A:
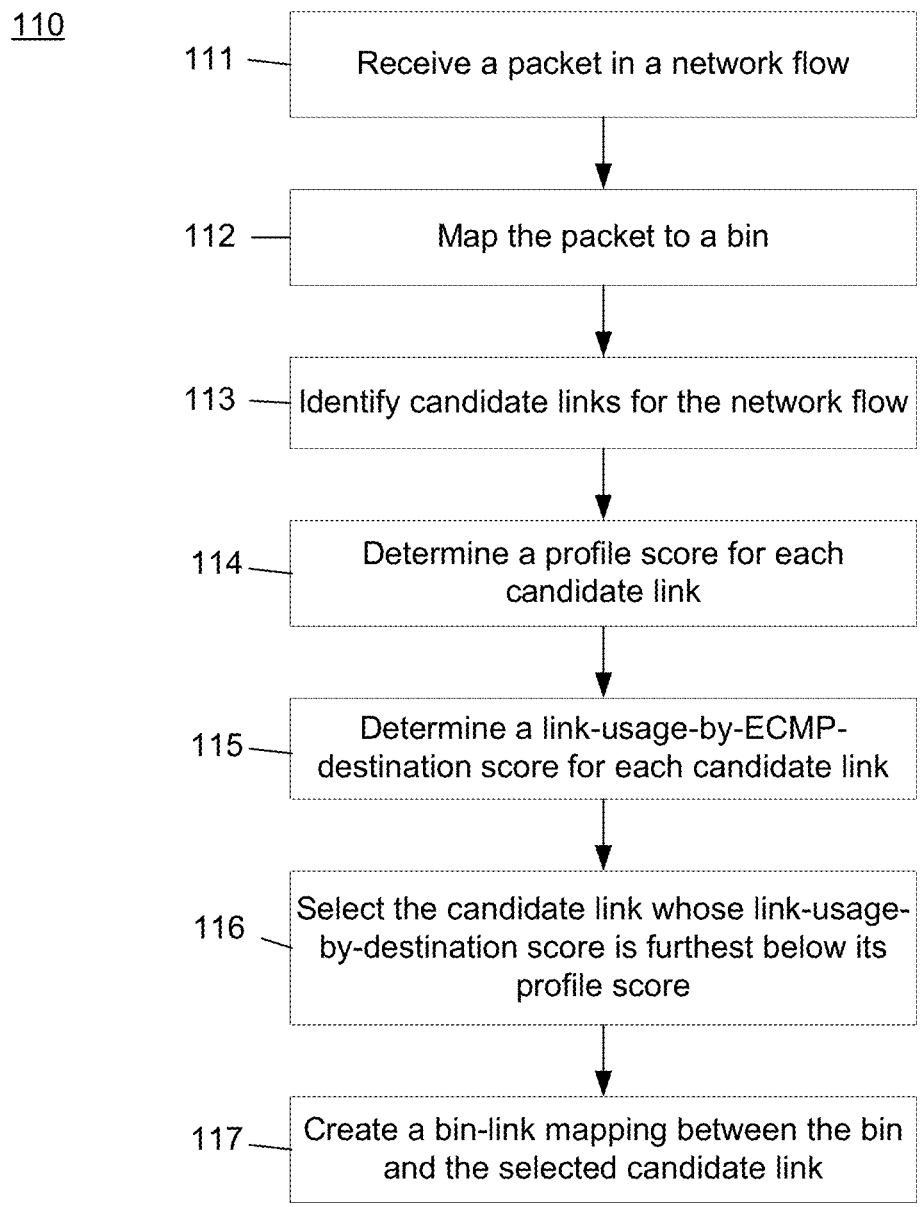
FIG. 1(a) illustrates a flow chart of an example method for load balancing network traffic, according to an example.

Load balancing of network traffic can be performed in order to better use network resources. If load balancing is not performed, some links can become overused while others remain lightly used. The overused links can cause bottlenecks in the network leading to traffic congestion. Load balancing attempts to avoid congestion by spreading the network traffic over the available links in a more optimal fashion, so as to try to avoid overutilization of any single link. Whenever there are multiple paths network flows can be sent along Load balancing can be especially useful in data center networks, where dynamically changing high bandwidth traffic patterns should be handled efficiently with high performance and low cost. In some implementations, the equal-cost multipath (ECMP) routing protocol is used to calculate the various paths through the network that a network flow can follow to reach its destination. The paths calculated by the ECMP protocol are considered to be equal cost because each path traverses the same number of intermediate devices from the current device (i.e., the device performing the load balancing) to the destination. While the examples described herein focus on data center networks employing the ECMP routing protocol, the disclosed techniques may be applied to other types of networks and to other methods of calculating available paths beyond the ECMP protocol.

Many load balancing techniques do not consider the impact of the load balancing decision on downstream network devices because obtaining feedback from downstream network devices in a network can use a large amount of resources and time, making it infeasible for a typical network. Instead, these load balancing techniques tend to make a load balancing decision based on locally available information. As an example, ECMP-based load balancing involves load balancing over the identified equal cost paths by attempting to load balance over the available links equally. However, by considering only locally available information and optimizing the load balancing decision only for the current network device, the load balancing decision can inadvertently create problems for downstream network devices, such as overloading certain downstream network devices while underutilizing others. Thus, the load balancing decision can result in an imbalance in the downstream network even though it improves the balance for the local device.

Examples disclosed herein provide techniques for load balancing that consider the impact of the load balancing decision on downstream network nodes. These load balancing techniques can be applied to any network, but are described with respect to a data center network implementing equal-cost multipath routing (ECMP) according to the ECMP routing protocol.

FIGS. 1(a), 1(b), and 2 illustrate methods to load balance network traffic flows, according to an example. Methods 110, 120, 210 may be performed by a computing device, such as a network switching device. Aspects of the method may be implemented by processing resources of the network switching device.

Methods 110, 120, 210 will be described here relative to environment 300 of FIG. 3. Environment 300 may include multiple network switching devices 310. These devices may be network infrastructure devices in a network, such as Ethernet switches and Internet Protocol routers. These devices may be connected together via links, which may be connections via a physical medium between one or more ports of network switching device 310 to one or more ports of another network switching device.

These network infrastructure devices may be arranged in any network topology that provides multiple paths. For the examples here a Clos network topology 360, which is a multi-stage network hierarchy structure often used in data centers that exploits multiple paths, is used for illustration. In the example Clos network 360, there are top-of-rack switches 361 (ToR1-ToR4, though there can be more), aggregation switches 362 (Agg1-Agg4, though there can be more), and core switches 363 (Core1-Core4, though there could be more). The top-of-rack switches are switches installed in a server rack and provide network connectivity to the servers installed in the rack.

If a server connected to ToR1 is transmitting a network flow destined for a server connected to ToR3, the flow will pass through the aggregation switch stage, the core switch stage, back through the aggregation switch stage, to ToR3. Accordingly, there are many potential paths the network flow can take through Clos network 360, since the flow need only pass through one switch each time it passes through the layer (i.e., Agg1 or Agg2, then one of Core 1-4, then Agg3 or Agg4). Various layer 3 routing techniques may be used to compute available paths through the network. For example, the equal-cost multipath path (ECMP) policy may be used to identify potential paths with seemingly equal costs. ECMP policy creates groups of these paths (referred to herein as "ECMP groups") such that any path in the group may be used to send the network flow to its destination. Network flows may be load balanced across the paths in these groups.

Network switching devices 310 may include ports 311 for receiving packets in network flows 340 and a bin mapper module 312 to map the packet to one of a plurality of bins. Device 310 may further include a path determination module 313 to determine candidate paths by which a received packet can travel through the network to its destination. To travel on any of the determined paths, device 310 will send the packet to a next network switching device in the path via a link. Device 310 can include a profile score module 314 to determine a profile score for each link. The profile score can indicate a target usage ratio of the link relative to other links for the destination. Device 310 can also include a linkusage-by-destination score module 315 to determine an actual usage of the candidate link relative to other links for the destination. Device 310 can also include a load balancer 316 to select the candidate link whose link-usage-by-destination score is furthest below its profile score. Load balancer 316 can then create a bin-link mapping between the bin and the selected candidate link, and the selected candidate link can be used to forward the received packet and subsequent packets in the network flow. Counters 317 can be used to track the number of bytes sent per link to a given destination. These elements will be described in more detail below with reference to methods 110, 120, 210.

Network switching device 310 may include one or more processing resources and one or more machine-readable storage media. A processing resource may include one or more central processing unit (CPU), one or more semiconductor-based microprocessor, one or more digital signal processor (DSP) such as a digital image processing unit, other hardware devices or processing elements suitable to retrieve and execute instructions stored in memory, or combinations thereof. The processing resource can include single or multiple cores on a chip, multiple cores across multiple chips, multiple cores across multiple devices, or combinations thereof. The processing resource may fetch, decode, and execute instructions from memory to perform various functions. As an alternative or in addition to retrieving and executing instructions, the processing resource may include one or more integrated circuit (IC), including an application specific integrated circuit (ASIC), a content addressable memory (CAM) or ternary content addressable memory (TCAM), other control logic, other electronic circuits, or combinations thereof that include a number of electronic components for performing various tasks or functions.

The processing resource may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, network switching device may include one or more machine-readable storage media separate from the one or more processing resources, as well as additional hardware elements, such as TCAMs and ASICs. The described modules implemented by network switching device 310 are a combination of hardware and software or hardware only to implement the function(s) of the module.

Turning to FIG. 1(*a*), method 110 may be used to load balance network traffic flows across ports of network switching device 310, according to an example. While the method focuses on a single network flow (with a single destination) for ease of explanation, it should be understood that this method and the techniques described herein can be applied to load balance many network flows having different destinations throughout the network. Additionally, the method is described with respect to a first received packet in a network flow. The method may not be followed in the same order for an existing network flow that is being rebalanced (e.g., such as at a flowlet boundary of the network flow, as described with respect to method 210) and steps of the method may be omitted, performed at different time intervals, and performed at different frequencies relative to other steps.

At 111, device 310 can receive a packet via one of ports 311. The packet may be a packet in a network flow. A network flow refers to a series of packets sent from a source to a destination that are related to the same workload. For example, packets sent from one device to another related to a video conferencing session may constitute a single network flow.

At 112, the packet may be mapped to a bin by bin mapper module 312. In particular, device 310 can maintain a load balancing table comprising a plurality of bins (e.g., table entries) and may map received packets to bins using a hash function, for example. The hash function may operate on a combination of fields in the received network packet to hash the packet to one of the bins. The bins may be associated with different destinations. Since device 310 is implementing the ECMP routing protocol, the bins are associated with ECMP destinations. An ECMP destination is a final destination node in an ECMP path. For example, if a server connected to ToR1 in Clos network 360 is sending a network flow to a server connected to ToR3, then the ECMP destination is the network switching device ToR3 even though the ultimate destination is the server connected to ToR3. This is because ToR3 would be the last network node in the ECMP path from ToR1 to ToR3. Multiple bins may be associated with the same ECMP destination.

In some examples, counters 317 may be associated with the plurality of bins. Each bin may have a counter in order to track how much traffic has been mapped to each bin. Thus, when a packet is mapped to a bin, the corresponding counter may be incremented by the size of the packet. For example, the counters may be byte counters and may track the number of bytes of the packets mapped to their corresponding bins. In some examples meters or other mechanisms instead of counters can be used to measure the amount of traffic mapped to each bin, but such are still within the meaning of the term "counter" as referred to herein. Additionally, the counters can be configured to measure traffic over a sliding window of time, such that the counter value at any time represents the amount of traffic mapped to the bin over the sliding window (e.g., over the last 1 second).

Blocks 113-117 relate to making a load balancing decision regarding which of multiple available links of device 310 should be used to send the packet (and subsequent packets in the network flow) to its ECMP destination. As described later with respect to FIG. 2, such a decision can be made at flowlet boundaries of the network flow so as to lessen the chances of packet misordering within the flow (that is, to lessen the chances that later-sent packets of the network flow arrive to the destination prior to earlier-sent packets of the network flow).

At 113, device 310 may identify candidate links, which are links of device 310 that can be used to send the packet to its destination. For example, the path determination module 313 may first determine the available paths from device 310 to the ECMP destination of the network flow. The links may be part of a link aggregation group according to the Link Aggregation Group (LAG) protocol. Such links may be considered separately for purpose of the load balancing decision or may be considered together. Path determination module 313 may make this determination by executing the ECMP routing protocol. For example, ignoring failed link 464, if device 310 is ToR1 and the ECMP destination is ToR3, path determination module 313 may initially identify the following four paths:

Path 1: Agg1-Core1-Agg3-ToR3
Path 2: Agg1-Core2-Agg3-ToR3
Path 3: Agg2-Core3-Agg4-ToR3
Path 4: Agg2-Core4-Agg4-ToR3

However, taking failed link 464 into account, path determination module 313 may identify the following three paths as available:

Path 1: Agg1-Core1-Agg3-ToR3
Path 2: Agg1-Core2-Agg3-ToR3
Path 3: Agg2-Core3-Agg4-ToR3

These paths may be computed using information available from device 310's routing information base (RIB). Additionally, other path determination techniques may be used. For example, a non-minimum cost path technique may be used to determine one or more available paths that may be used in addition to available paths calculated using ECMP. An example technique is described in PCT/US2014/055197, entitled "Non-Minimum Cost Forwarding For Packet-Switched Networks," filed on Sep. 11, 2014.

Using the available path information, device 310 may determine that there are two candidate links for sending the packet to the ECMP destination: the link connecting ToR1 to Agg1 and the link connecting ToR1 to Agg2. These are the two next hop links from ToR1 that are implicated by the identified available paths. For ease of explanation these links will be referred to as Agg1-Link and Agg2-Link.

At 114, device 310 may determine a profile score for each candidate link using profile score module 314. The profile score is used to indicate a target ratio of network traffic to send on the candidate links to reach the ECMP destination. This ratio is the target that load balancer 316 will aim for when load balancing according to these techniques. The profile score is initially determined for each candidate link by dividing the number of available paths passing through the candidate link by the total number of available paths to the ECMP destination (using any of the links). For example, the profile score for Agg1-Link is $\frac{2}{3}$ (i.e., 0.66) and the profile score for Agg2-Link is $\frac{1}{3}$ (i.e., 0.33). Note that if failed link 364 was operable, making Path 4 available, the profile score for Agg1-Link would be $\frac{2}{4}$ (i.e., 0.5) and the profile score for Agg2-Link would also be $\frac{2}{4}$ (i.e., 0.5), since there would be two paths to ToR3 from each aggregation switch.

While it is common in a data center for link bandwidth to be equal, it is possible to have disparate bandwidth between links. The profile scores can be adjusted to accommodate disparate bandwidth. For instance, in the case of four links A-D where A, B, and C have equal bandwidth and the D has half the bandwidth of the other links, the profiles scores for all four links (A, B, C, D) could be computed as follows:

$$(2,2,2,1)*100/7=(0.28,0.28,0.28,0.14)$$

Although the profile scores add up to 0.98 instead of 1.0 in this example, that is sufficient because the profile score is merely a ratio with the purpose of achieving relative balance between links.

The profile score is useful because it can prevent unintentional overloading of downstream nodes from device 310/ToR1. If typical ECMP load balancing were employed, ToR1 would send roughly equal amounts of traffic to Agg1 and Agg2 despite link failure 364. ToR1 would do this because it would not be considering the impact of the load balancing decision on downstream network nodes, and instead it would merely be trying to load balance over its own links. However, due to failed link 364, Core 3 would become overloaded relative to Core1 and Core2 (Core 4 would not be used since it has a failed link 364 preventing it from sending traffic to Agg4). In particular, Core1 and Core2 would each receive about ¼ of the traffic load to ECMP destination ToR3, while Core3 would receive about ½ of the traffic load to ECMP destination ToR3. However, by computing profile scores for the candidate links that take into account the proportion of available paths that use that link, a load balancing decision can be made by ToR1 that considers the impact of the decision on downstream nodes, like Core3.

Profile scores can be recalculated. For example, profile scores can be recalculated on a set periodic basis. Profile scores may also be recalculated based on a triggering event, such as a link failure. In such a case, a switch will be notified of the link failure via an update to its routing information base. Such an update may be a trigger to recalculate the profile score for ECMP destinations impacted by the link failure. Profile scores do not need to be recalculated every time a network flow is rebalanced. As long as a profile score exists for the link and the ECMP destination, that profile score can be used instead of performing block 114.

Profile scores may also be adjusted based on various criteria. For example, a system operator or an SDN controller may bias profile scores and/or bias the ratios used to generate the profile scores. Such adjustments may be made at any time and may be made to take into account other information not considered when the profile scores are generated according to the above techniques.

At 115, device 310 may determine a link-usage-by-ECMP-destination score for reach candidate link using link-usage-by-destination score module 315. The link-usage-by-ECMP-destination score is used to determine whether a candidate link is being utilized for traffic to a particular ECMP destination in accordance with its profile score for that ECMP destination. The link-usage-by-ECMP-destination score represents the amount of traffic that has been sent to the ECMP destination via the candidate link over a given period of time relative to the total amount of traffic that has been sent to the ECMP destination via all of the candidate links over the given period of time. The period of time may be a sliding window of time. The link-usage-by-ECMP-destination score may be calculated on a periodic basis. It may be updated according to a specified schedule, and may be updated more regularly than a candidate link is selected and more regularly than the profile score is updated.

Link-usage-by-ECMP-destination score module 315 may perform method 120 of FIG. 1(*b*) to calculate the link-usage-by-ECMP-destination score for a candidate link. At 121, module 315 may determine a total number of bytes sent along the candidate link toward the ECMP destination over a sliding window. The total number of bytes sent along the candidate link toward the ECMP destination may be determined by aggregating the values in counters 317 for all bins that are associated with both the candidate link and the ECMP destination. If a bin is associated with both, then it means the packets that were mapped to the bin were sent along the candidate link to the ECMP destination. By aggregating the values of the corresponding counters of all such bins, the module 315 obtains the total number of bytes that have been sent to the ECMP destination via the candidate link over the sliding window. As mentioned previously, the counters may be configured to measure the traffic over just the sliding window.

At 122, module 315 may calculate the link-usage-by-ECMP-destination score for the candidate link by dividing the number of byes determined at block 121 by a total number of bytes sent to the ECMP destination along all candidate links over the sliding window. Module 315 may obtain the total number of bytes sent to the ECMP destination along all candidate links by aggregating the values from the corresponding counters of all bins that are associated with both any of the ECMP destinations and any of the candidate links. With reference to the example of sending traffic from ToF1 to ToR3, the relevant bins would be any bins that are associated with either Agg1-Link or Agg2-Link and that are associated with/map to ToR3 as the ECMP destination. As an example, 50 bins might be associated with Agg1-Link and ToR3 with a total aggregated counter value of 5.5 MB. 55 bins might be associated with Agg2-Link and ToR3 with a total aggregated counter value of 4.5 MB. The total number of bytes for all links would thus be 10 MB. The link-usage-by-ECMP-destination score for Agg1-Link would be 5.5/10 (i.e., 0.55) and the link-usage-by-ECMP-destination score for Agg2-Link would be 4.5/10 (i.e., 0.45).

Returning to FIG. 1(a), method 110 continues at 116, where device 310 may select the candidate link whose link-usage-by-ECMP-destination score is furthest below its profile score. Load balancer 316 may perform this operation. For example, the link-usage-by-ECMP-destination score for Agg1-Link is 0.55 and for Agg2-Link is 0.45. The profile score for Agg1-Link is 0.66 and for Agg2-Link is 0.33. Agg1-Link is thus 0.11 below its profile score while Agg2-Link is 0.12 above its profile score. Accordingly, load balancer 316 will select Agg1-Link as the candidate link to use since it is furthest below its profile score. This is in contrast to the ECMP load balancing technique described previously that naively balanced equally between its links without considering impact on downstream network nodes. With such a technique, Agg2-Link would be selected in order to bring its utilization closer to Agg1-Link's utilization.

At 117, load balancer 316 may create a bin-link mapping between the bin that the received packet was mapped to (from block 112 of method 110). Network switching device 310 may then forward the packet toward its ECMP destination (ToR3) via Agg1-Link. Load balancer 316 may leave the bin-link mapping unchanged for a period of time so that device 310 continues to forward received packets in the network flow along the same link (i.e., Agg1-Link). This can be done in order to prevent packet reordering during transit of the network flow through the network. If different paths are used for every new packet, there is a chance that the packets will not arrive at the destination in the same order the packets were sent due to latencies and other issues in the network. Accordingly, the bin-link mapping can be left in place for the life of the flow or until an appropriate load balancing opportunity.

In an example, load balancing may be performed along flowlet boundaries of a network flow. Within a particular flow, a flowlet is a burst of packets separated by an idle period. Flowlets exist in most flows and can be the result of the burstiness of the Transport Control Protocol, which is the dominant transport layer protocol in the Internet Protocol suite. Thus, by detecting flowlet boundaries, device 310 can rebalance at these boundaries (i.e., during the idle time of the flow) with a lower likelihood of affecting intra-flow packet order. Device 310 may thus leave the bin-link mapping in place at least until a flowlet boundary is detected.

Device 310 may perform method 210. At 211, device 310 may determine a next-up link for the ECMP destination associated with the network flow. The next-up link is a candidate link that should be used next for the ECMP destination. It can be useful to have a next-up link precomputed for a future load balancing decision in order to minimize delay in making the load balancing decision for a network flow. The next-up link may be determined in the same way that the candidate link selected in block 116 was determined. For example, assuming the link-usage-by-ECMP-destination score of Agg1-Link is still further below its profile score than Agg2-Link after the bin-link mapping, Agg1-Link would also be the next-up link.

At 212, device 310 may detect a flowlet boundary in the network flow using a flowlet determination module within load balancer 316. The flowlet determination module may detect a flowlet boundary based on the elapse of a threshold period of time since receiving a currently received packet of the network flow and the next most recently received packet. If the time difference between receiving the two packets exceeds the threshold, the flowlet determination module can indicate to the load balancer that a flowlet boundary has been detected in the network flow. At 213, load balancer 316 may create a new bin-link mapping between the bin (corresponding to the network flow) and the next-up link. In some examples, several next-up links may be computed in advance.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the systems and methods of the present disclosure, this specification merely sets forth some of the many possible embodiments, configurations, and implementations. Furthermore, numerous details are set forth to provide an understanding of the system, method, and techniques of the disclosure. However, it will be understood by those skilled in the art that the system, method, and techniques may be practiced without these details. While the system, method, and techniques have been disclosed with respect to a limited number of embodiments, those skilled in the art will appreciate numerous modifications and variations therefrom. It is intended that the appended claims cover such modifications and variations.

What is claimed is:

1. In a network switching device, a method to load balance network flows across links of the device, the method comprising:
 receiving a packet in a network flow;
 mapping the packet to a bin of a plurality of bins;
 identifying candidate links for the network flow, the candidate links being links of the device that are available to forward the packet to its equal-cost multipath (ECMP) destination;
determining a profile score for each candidate link by, for each respective candidate link, dividing a number of available paths along the respective candidate link by a number of total available paths from the device;
determining a link-usage-by-ECMP-destination score for each candidate link, the link-usage-by-ECMP-destination score indicating an amount of traffic sent along the candidate link toward the ECMP destination over a period of time relative to other candidate links;
selecting the candidate link whose link-usage-by-ECMP-destination score is furthest below its profile score;
creating a bin-link mapping between the bin and the selected candidate link; and
forwarding the packet along the candidate link.

2. The method of claim 1, wherein identifying candidate links for the network flow, determining a profile score for each candidate link, determining a link-usage-by-ECMP-destination score for each candidate link, and selecting the candidate link whose link-usage-by-ECMP-destination score is furthest below its profile score are performed prior to receiving the packet.

3. The method of claim 1, wherein determining the link-usage-by-ECMP-destination score for a candidate link comprises:
determining a number of bytes sent along the candidate link toward the ECMP destination over a sliding window period of time by reading counter values for each bin of the plurality of bins that maps to the candidate link and to the ECMP destination, wherein the counter values are obtained from byte counters associated with each bin; and
calculating the link-usage-by-ECMP-destination score for the candidate link by dividing the determined number of bytes for the candidate link by a total number of bytes sent along all candidate links toward the ECMP destination.

4. The method of claim 1, further comprising determining the total available paths from the device using ECMP routing protocol, wherein the available paths along the respective candidate link are the subset of total available paths that use the respective candidate link.

5. The method of claim 1, further comprising:
determining that an available path of the total available paths is no longer available; and
redetermining the profile score for each candidate link.

6. The method of claim 1, further comprising leaving the bin-link mapping unchanged at least until a flowlet boundary is detected in the network flow.

7. The method of claim 6, further comprising:
determining a next-up link for the ECMP destination by determining a new link-usage-by-ECMP-destination score for each candidate link and designating the candidate link whose link-usage-by-ECMP-destination score is furthest below its profile score as the next-up link for the ECMP destination.

8. The method of claim 7, further comprising:
detecting a flowlet boundary in the network flow; and
creating a new bin-link mapping between the bin and the next-up link.

9. The method of claim 8, wherein the flowlet boundary in the network flow is detected based on the elapse of a threshold period of time since receiving a most recent packet in the network flow and the next most recently received packet in the network flow.

10. A network switching device, comprising:
a port to receive a packet in a network flow;
a processing resource; and
a non-transitory machine-readable storage medium encoded with instructions, the instructions executable by the processor to cause the network switching device to:
map the packet to a bin of a plurality of bins;
determine available paths from the network switching device to a destination device for the packet;
determine a profile score for each candidate link implicated by the determined available paths, the profile score being based on a proportion of the available paths that use the candidate link;
to determine, for each candidate link, a link-usage-by-destination score that represents an amount of traffic that has been sent on each candidate link to the destination relative to all candidate links; and
select a candidate link for the network flow based on comparing the profile scores of the candidate links with the link-usage-by-destination scores of the candidate links and create a bin-link mapping between the bin and the selected candidate link.

11. The device of claim 10, wherein the device is to forward the packet and subsequent packets in the network flow along the selected candidate link.

12. The device of claim 10, further comprising a plurality of counters corresponding to the plurality of bins, wherein the counter corresponding to the bin is incremented by a size of the packet when the packet is mapped to the bin.

13. The device of claim 12, wherein the the link-usage-by-destination score for each candidate link is determined by:
determining a number of bytes sent along the candidate link toward the destination over a sliding window period of time by reading counter values of corresponding bins that map to both the candidate link and to the destination; and
calculating the link-usage-by-destination score for the candidate link by dividing the determined number of bytes by a total number of bytes sent along all candidate links to the destination.

14. The device of claim 10, wherein the instructions executable by the processor cause the network switching device to determine whether future packets in the network flow are received along a flowlet boundary of the network flow, wherein the load balancer is to reselect a candidate link for the network flow in response to a determination that a future packet is received along a flowlet boundary.

15. The device of claim 10, wherein the available paths are determined using equal-cost multipath routing protocol.

16. The device of claim 10, wherein the available paths are determined using a routing information database.

17. The device of claim 10, wherein a path of the available paths is a non-minimum cost path used in a non-minimum cost forwarding scheme.

* * * * *